United States Patent Office 3,817,913
Patented June 18, 1974

---

3,817,913
DIFFICULTLY-INFLAMMABLE ACRYLIC COMPOSITIONS
Wolfgang Gaenzler, Darmstadt-Eberstadt, and Guenter Schroeder, Upper-Ramstadt, Germany, assignors to Rohm GmbH, Darmstadt, Germany
No Drawing. Filed Jan. 17, 1973, Ser. No. 324,413
Claims priority, application Germany, Jan. 21, 1972, P 22 02 791.4
Int. Cl. C08d 7/10
U.S. Cl. 260—45.7 P       7 Claims

ABSTRACT OF THE DISCLOSURE

Difficultly-inflammable acrylic glass compositions which are the free-radical polymerization product of polymerizable compounds in a mixture comprising, per 100 parts by weight:

(a) 50-87 parts of methyl methacrylate;

(b) 10-40 parts by weight of a member selected from the group consisting of tribromneopentyl acrylate, tribromneopentyl methacrylate, and bromphenyl compounds of the formula

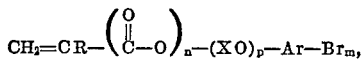

wherein R is hydrogen or lower alkyl, X is alkylene, Ar is phenyl or substituted phenyl, $n=0$ or 1, $p=0$ when $n=0$, $p=0$ or 1 when $n=1$, and $m$ is an integer from 1 to 5; and (c) 40 to 3 parts by weight of a flame-inhibiting phosphorus compound such as phosphoric acid, or a phosphoric or a phosphonic acid ester.

---

The present invention relates to difficultly-inflammable acrylic glasses, i.e. transparent or translucent acrylic compositions.

A large number of phosphorus compounds have proved suitable as additives to decrease the inflammability of synthetic resins. For example, according to German Patent 1,032,540 free phosphoric acid is employed to render acrylic glass difficultly inflammable. In addition, esters of phosphoric acid or of organic phosphonic acids are also employed. Particularly useful additives are those esters which contain aliphatically-bound chlorine. In amounts of from 10-20 percent, used alone or in combination, compounds of this type decrease the inflammability of acrylic glass to such an extent that although it does catch fire and burn in a flame, it is self-extinguishing within a few seconds after removal from the flame.

The aforementioned compounds nevertheless all have the disadvantage that they decrease the resistance of the acrylic glass to deformation by heat, as well as decreasing its mechanical strength. Whereas pure acrylic glass (i.e. polymethylmethacrylate) has a softening temperature according to Vicat of 131° C., this softening temperature decreases upon the addition of 10 percent of a highly effective halogenated phosphonic acid ester to 110° C., and to 84° C. upon addition of 30 percent of this ester. Such a decrease in the resistance to heat is a serious obstacle in many fields of use, particularly since slow deformation can occur even at temperatures considerably below the softening temperature according to Vicat. Under certain circumstances, such as if an acrylic glass is used as a skylight or as a light-dome or if—even when it is darkly colored—it is used for facing elements, and is thus exposed to strong sunlight, warming to temperatures in the region of 50° C.–80° C. may be encountered. Further, such temperatures can be locally generated if portions of an acrylic glass are placed close to radiators, heated pipes, or other heat sources. Above all, warming into the region of incipient deformation must be avoided if the acrylic glass has been stretched or has been formed by deep-drawing or blowing. Heating in this case leads to shrinking or a return to the original form.

For these reasons, flame-inhibiting additives have been sought which have an efficacy comparable with the aforementioned phosphorus compounds but which do not decrease the resistance to deformation by heat of acrylic glass in the same manner. It is known that bromphenyl methacrylate having from 2–5 bromine atoms in the phenyl group is not inflammable in the monomeric or polymeric form. Copolymers of these monomers with methyl methacrylate, in which it forms a fraction of from 15–35 percent by weight, are practically unchanged with respect to their resistance to deformation by heat in comparison with pure polymethylmethacrylate: according to Vicat, a resistance to deformation by heat of 132°–133° C. is measured. Unfortunately, these copolymers cannot be considered as difficultly inflammable acrylic glasses, since even with a content of 35 percent by weight of tribromphenylmethacrylate, such a resin ignited in a flame continues to burn after removal from the flame. This is possibly attributable to the fact that the copolymer at the burning temperature is as readily depolymerized as pure polymethylmethacrylate. As a result, on depolymerization, monomeric methylmethacrylate, which is readily inflammable, is produced in considerable amount. The inflammability of the monomeric ester is apparently not decreased by the presence of bromphenylmethacrylate.

It has now been found that the softening temperature of copolymers of methylmethacrylate with certain bromine-containing comonomers are only slightly reduced by the addition thereto of known phosphous-containing flame-inhibitors. This is in part demonstrated in the following Table relating to copolymers containing various bromphenylmethacrylates, in which Table the percentages given are by weight.

| Example | | Polymer composition, percent | | | Vicat softening temperature (° C.) | Change in softening point with respect to PMMA (° C.) |
|---|---|---|---|---|---|---|
| | | MMA | BPMA | PA-PA ester | | |
| 1–4 | (A) | 100 | | | 131 | |
| | | 90 | | d 10 | 110 | −21 |
| | | 75 | | d 25 | 91 | −40 |
| | | 70 | | d 30 | 84 | −47 |
| 5–10 | (B) | 85 | a 15 | | 133 | +2 |
| | | 85 | b 15 | | 133 | +2 |
| | | 80 | c 20 | | 132 | +1 |
| | | 75 | c 25 | | 132 | +1 |
| | | 70 | c 30 | | 133 | +2 |
| | | 65 | c 35 | | 133 | +2 |
| 11–15 | (C) | 70 | b 20 | d 10 | 117 | −14 |
| | | 70 | c 20 | d 10 | 123 | −8 |
| | | 75 | a 15 | d 10 | 120 | −11 |
| | | 74.7 | c 20 | e 5.3 | 129 | −2 |
| | | 70 | a 20 | f 10 | 125 | −6 | a Pentabromphenylmethacrylate.
b Dibromphenylmethacrylate.
c Tribromphenylmethacrylate.
d Halogenoalkyl phosphonate according to the formula in col. 4, lines 38–40.
e Phosphoric acid.
f Tris-(bromcresyl)-phosphate.

NOTE.—MMA=Methylmethacrylate; PMMA=Polymethylmethacrylate; BPMA=Bromphenylmethacrylate; PA-PA ester=phosphoric acid or phosphorus acid ester.

Surprisingly, the bromphenylmethacrylate additive not only has the effect of maintaining the resistance to deformation to heat, but it concurrently decreases inflammability to a certain extent, which is not true of copolymers thereof with methylmethacrylate which are free of phosphorus compounds. As a result of this synergistic effect, the inflammability of a methylmethacrylate/tribromphenylmethacrylate resin is decreased by the addition of 10 percent by weight of a halogenated phosphonic acid ester to the same extent as is brought about by the addition of 20 percent of the halogenated phosphonic acid ester to pure polymethylmethacrylate.

Thus, a feature of the present invention is a difficultly inflammable acrylic glass comprising polymethylmethacrylate and having a content of phosphoric acid, phosphoric acid esters, or phosphonic acid esters, and more particularly comprising the free-radical polymerization product of a mixture containing, per 100 parts by weight thereof:

(a) 50–87 parts by weight of methyl methacrylate,
(b) 10–40 parts by weight of a member selected from the group consisting of tribromneopentyl acrylate, tribromneopentyl methacrylate, and bromphenyl compounds of the formula

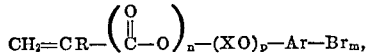

wherein R is hydrogen or lower alkyl; X is alkylene preferably having 1 to 4 carbon atoms; Ar is phenyl, which may be substituted other than with bromine, e.g. with lower alkyl; $n=0$ or 1, $p=0$ when $n=0$, $p=0$ or 1 when $n=1$, and $m$ is an integer from 1 to 5; and (c) 40–3 parts by weight of phosphoric acid or of esters thereof, or of esters of an organic phosphonic acid. Optional conventional additives may also be included in the composition.

As monomers of the formula

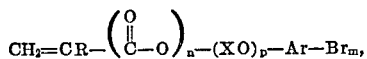

wherein R, Ar, $n$, $p$, and $m$ have the meanings given above, brominated styrene derivatives and acrylic acid and methacrylic acid esters of bromphenols and alkyl(bromphenols) are of particular interest. For a flame-inhibiting action, only the number of bromine atoms is of significance, not their position in the aromatic ring. As suitable monomers of this type, monobromstyrene, dibromstyrene, tribromstyrene, tetrabromstyrene, pentabromstyrene, tribromo-α-methylstyrene, dibromo- or tribromo-vinyl-toluene, and the acrylic acid and methacrylic acid esters of bromphenol, dibromphenol, tribromphenol, tetrabromphenol, pentabromphenol, dibromcresols, and tribromcresols can be mentioned. Mono- and poly-bromphenoxyalkyl esters of acrylic and methacrylic acid, such as tribromphenoxyethyl methacrylate are also encompassed by this formula.

Tribromneopentyl acrylate and methacrylate have the formula

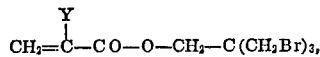

where Y is hydrogen or methyl.

As the phosphorus-containing additive, in principle all the known flame-inhibiting phosphorus compounds can be employed providing they are soluble in the monomer mixture from which the polymer is formed.

As is well known in the art these compounds are converted during burning to non-flammable oxides of phosphorus which are non-volatile even at high temperatures and which form a protective coating on the burning plastic, excluding oxygen therefrom and in this way inhibiting further burning.

Among these compounds, orthophosphoric acid should be mentioned first. However, because of its strongly hydrophilic nature, it can influence the weather resistance of an acrylic glass and, for this reason, is suitably used as an additive only in those materials which are not exposed to weathering.

More advantageously, aliphatic and aromatic hydrocarbon, oxyhydrocarbon, and halohydrocarbon esters of orthophosphoric acid are employed, including alkyl, aryl, aralkyl, and alkaryl compounds such as diethylphosphate, triethylphosphate, tri-(2-ethylhexyl)-phosphate, trihexylethylphosphate, tricresylphosphate, and cresyl phenyl phosphate. Alkoxyalkyl esters may also be employed, such as tributoxy ethyl phosphate.

Preferably, halogen-containing—particularly chlorine-containing—esters of phosphoric acid are used. In general, these include halo-substituted saturated and unsaturated aliphatic hydrocarbon esters of phosphoric acid, e.g. bis- or tris-(β-chloroethyl)-phosphate, tris-bromethyl phosphate, tris-(1,3-dichloropropyl)-phosphate, tris-(2,3-dibromopropyl)-phosphate, tris-chlorophenyl-phosphate, allyl-bis-dibromopropyl-phosphate, and bis-allyl-bromopropyl-phosphate.

In general, the most-preferred phosphoric acid esters have the formula

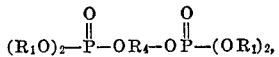

wherein $R_1$ is the same or different β-halogenoalkyl groups and $R_4$ is alkylene which may be halo-substituted.

Phosphonic acid esters of halo-substituted saturated and unsaturated aliphatic hydrocarbons can also be employed according to the invention.

A group of organic phosphonic acid esters of the general formula $$R_1—PO(OR_1)—[O—CR_2R_3—PO(OR_1)]_n—OR_1$$

are employed to particular advantage, wherein $n$ is a whole number from 1 to 10. In this formula, $R_1$ is the same or different β-halogenoalkyl groups, preferably having from 2–4 carbon atoms; $R_2$ taken alone is hydrogen, alkyl, or aryl, preferably hydrogen or methyl; $R_3$ taken alone is alkyl or aryl, which may also be halogen-substituted, preferably methyl; and $R_2$ and $R_3$ taken together form a cycloaliphatic ring. Compounds of this type are obtained from a trivalent phosphorus compound, a carbonyl compound, and a phosphoric acid ester according to the teachings of U.S. Patent 3,014,944. An example of such a compound is

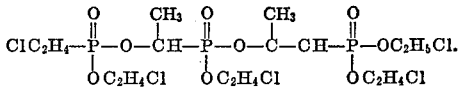

Finally, oligomeric esters of phosphoric acid or organic phosphonic acids with diols can be employed, e.g.

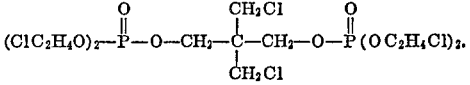

The amount of phosphorus-containing compounds and of the bromine-containing monomers incorporated in the acrylate plastics according to the present invention depends, on the one hand, on the requirements imposed by the desired burning behavior and, on the other hand, on the values desired for the resistance to deformation by heat and for the mechanical properties. Even if the last-mentioned properties are little influenced, in comparison with pure PMMA, by the combination according to the present invention, nevertheless in particular cases it can be important that they not be below certain fixed values for the resistance to deformation by heat and mechanical strength. In these cases, the content of phosphorus-containing compounds would be kept at a minimum. Resins of this kind are always still self-extinguishing, i.e. outside of an applied flame, the ignited resin does not burn further. The time required for extinguishment can, however, be longer than for a material with a higher content of phosphorus-containing additives. On the other hand, it can be desired in particular cases that the time to extinguishment after removal of the burning plastic from an applied flame be extremely short, or that the resin burn little or not at all in an external flame. This goal can be reached by the use of large amounts of the additives to be incorporated according to the present invention. The resistance to deformation by heat and the mechanical properties can in this manner decrease significantly below corresponding values for pure polymethylmethacrylate, but are nevertheless always still higher than for an acrylic glass to which the same burning behavior is imparted by the addition of phosphorus-containing additives alone.

It is pointed out that certain of the phosphorus-containing materials present in the claimed compositions are unsaturated. When mixtures containing such compounds are polymerized, the phosphorus compound, in whole or in part, may be present in the resulting copolymer as a component thereof. Any non-polymerized portion of such a compound, and the non-polymerizable phosphorus compounds, are in the compositions of the invention in admixture with a copolymer formed between the remaining, polymerizable, components.

The principal component in the difficultly-inflammable acrylate glass composition is, as a rule, methylmethylacrylate. As a rule, no other polymerizable components except the bromine-containing monomers are present in the resin. In principle it is neverthless possible to include further bromine-free comonomers, in replacement of a portion of the methylmethacrylate, for example acrylonitrile, acrylic acid, methacrylic acid, acrylamide or methacrylamide and their derivatives, acrylic acid esters, other esters of methacrylic acid, vinylidene chloride, styrene, or cross-linking monomers having at least two polymerizable olefinic bonds such as divinylbenzene, glycol dimethacrylate triallylcyanurate, allyl methacrylate, and the like. The fraction of monomers of this type present depends on the goal to be reached by their use and can, in particular cases, be as great as the amount of methylmethacrylate present, as is true, for example, in the case of acrylonitrile. Generally, however, such optional comonomers are present in only minor amounts.

The preparation of the difficultly-inflammable acrylic glass of the invention takes place in a conventional way. The components are mixed with a free radical-forming initiator, e.g. dibenzoylperoxide or azo-bis-isobutyronitrile, and are then polymerized at temperatures between 20° C. and 120° C. generally in a flat chamber comprising two glass plates and a rope gasket surrounding their perimeter. Conventional additives, such as pigments, soluble dyestuffs, fillers, etc., can be employed.

The difficultly-inflammable acrylic glass obtained in this manner can be used directly as a wall covering, skylight, or glazing material. Preferably, however, the material is biaxially stretched by at least 70 percent (increase in area), or is formed by deep drawing or blowing, preferably while in a thermoelastic state. (The thermoelastic state is that state of a resin, while at a temperature above its glass transition temperature, in which the application of a deforming force to the resin is met by an elastic opposing force such that the resin assumes its original form when the deforming force is removed. In contrast, a resin in its thermoplastic state retains its deformed shape if it is deformed by an external force. The temperature region in which a resin is thermoplastic always lies above that region in which the resin is thermoelastic.)

Precisely in the stretching and forming process, in which considerable forces operate on the material when in a thermoelastic condition, the improved mechanical strength of the materials of the present invention plays an which a resin is thermoplastic always lies above that rendered difficultly inflammable solely by the addition of phosphorus-containing compounds tears easily on stretching or forming, this danger is much lower in a material having the same degree of difficult inflammability but which is prepared according to the present invention. It is of considerable significance for the mechanical properties of the stretched or formed material that this working is carried out while the resin is in a thermoelastic state and not in a thermoplastic condition. The orientation of the macromolecules effected by stretching or forming in the thermoelastic condition significantly improves the mechanical strength properties and resistance to weathering. These improvements in properties occur to a noticeably greater degree in an acrylic glass according to the present invention in comparison with an acrylic glass which contains only phosphorus compounds as a flame-inhibiting additive and which is plasticized by these agents.

Difficultly-inflammable acrylic glasses according to the present invention can also be prepared by other methods which are known for the preparation of acrylic glasses. Thus, for example, sheet materials can be continuously prepared between moving metal bands, or resin masses suitable for forming into acrylic glass bodies either by injection molding or in an extrusion press can be prepared by bulk polymerization with subsequent grinding, by pearl polymerization or by other known processes.

A better understanding of the present invention and of its many advantages will be had by referring to the following specific examples given by way of illustration.

EXAMPLES 1–15

Difficultly-inflammable acrylic glass sheets are prepared by mixing the various components set forth in the Table given earlier in this application. 0.08 parts by weight of dilauryl peroxide and 0.06 parts by weight of azo-bis-isobutyronitrile are added to each 100 parts by weight of the mixtures. The mixtures are poured into flat chambers formed between two glass plates and a peripheral rope-gasket. The filled flat chambers are wormed for 16 hours in a water bath at 50° C. and, subsequently, for three hours in air at 100° C. to 115° C. The finished sheets are then removed.

According to the flame test defined in ASTM D 635–56T, pure polymethylmethacrylate (Example 1) and that sample of Group A of the earlier Table containing 10 percent by weight of a halogenoalkyl phosphonate (Example 2), and all samples of Group B (Examples 5–10), are inflammable. In contrast, the remaining samples of Group A (Examples 3 and 4) as well as the samples of Group C (Examples 11–15) are self-extinguishing according to this test.

EXAMPLES 16–19

Acrylic glass plates of decreased inflammability are obtained when mixtures each comprising 67 parts by weight of methylmethacrylate;
3 parts by weight of methacrylic acid;
20 parts by weight of tribromphenylmethacrylate; and
10 parts by weight of a phosphorus-containing flame-inhibiting agent (according to the following Table)

are polymerized in the presence of 0.08 parts by weight of dilauryl peroxide; and
0.06 parts by weight of azo-bis-isobutyronitrile.

The polymerization is carried out in flat chambers formed from glass plates and a circumferential rope gasket over a period of 18 hours at 50° C. and four hours at 115° C. The flame-inhibiting agents are given in the following Table, together with the inflammability evaluation according to ASTM D 635–56T and the Vicat softening temperature.

| Example | Flame-inhibiting agent | ASTM evaluation | Vicat softening temperature (° C.) |
|---|---|---|---|
| 16 | The flame-inhibiting agent of Col. 4, lines 38–40 of the specification ("Phosgard C22 R"). | Self-extinguishing (twice ignited); ABT=1:05 min.; ABD=19 mm. | 123 |
| 17 | Flame-inhibiting agent according to Col. 4, lines 44–46 of the specification ("Phosgard 2 XC 20"). | Self-extinguishing; ABT=2:49 min.; ABD=24 mm. | 119 |
| 18 | Tris-(2,3-dibrompropyl) phosphate ("Fyrol HB 32"). | Self-extinguishing; ABT=4:58 min.; ABD=53 mm. | 130 |
| 19 | Bis-(β-chloroethyl)-vinyl phosphonate ("Fyrol-Bis-beta"). | Self-extinguishing; ABT=2:44 min.; ABD=24 mm. | 124 |

NOTE.—ABT=average burning time; ABD=average burning distance.

The material of Example 16 is heated to 160° C., biaxially stretched to an area increase of 130-140 percent, and then cooled to room temperature.

EXAMPLE 20

A mixture of 60.5 parts by weight of methylmethacrylate;
3 parts by weight of methacrylic acid;
10 parts by weight of tribromophenylmethacrylate; and
16.5 parts by weight of triphenylphosphate is made into acrylic glass plates of reduced inflammability according to the methods of the preceding examples.

This polymer is classed as self-extinguishing (ABT=1:46 min.; ABD=19 mm.)

according to ASTM D 635–56T, and has a Vicat softening point of 101° C.

EXAMPLES 21 and 22

Acrylic glass plates of reduced inflammability are obtained when mixtures of 67 parts by weight of methylmethacrylate;
3 parts by weight of methacrylic acid;
10 parts by weight of a phosphorus-containing flame-inhibiting agent as disclosed in col. 4, lines 38–40 of the specification; and
20 parts by weight of a bromine-containing monomer, specifically tribromphenoxyethylmethacrylate (Example 21) or tribromneopentyl methacrylate (Example 22)

are polymerized in flat chambers by heating for 18 hours at 50° C. and for 4 hours at 115° C. after the addition to the mixtures of 0.08 part by weight of dilauryl peroxide and 0.06 part by weight of azo-bis-isobutyronitrile. The acrylic glass plates show the following properties:

| Ex. | ASTM evaluation | Vicat softening temperature (° C.) |
|---|---|---|
| 21 | Self-extinguishing; ABT=2:15 min.; ABD=20 mm. | 109 |
| 22 | Self-extinguishing; ABT=1:27 min.; ABD=17 mm. | 117 |

EXAMPLES 23 and 24

Mixtures of 67 or 72 parts by weight respectively of methylmethacrylate;
3 parts by weight of methacrylic acid;
10 parts by weight of a phosphorus-containing flame-inhibiting agent as disclosed in col. 4, lines 38–40 of the specification; and
20 parts by weight of 2,4,6-tribromophenylacrylate (Example 25) or 15 parts by weight of pentabromphenylacrylate (Example 24) respectively.

are made into acrylic glass plates of reduced flammability according to the methods of the preceding examples The ASTM D 635–56T-Evaluation and the Vicat-softening temperatures of these polymers are given in the following table:

| Example | ASTM-evaluation | Vicat softening temperature (° C.) |
|---|---|---|
| 23 | Self-extinguishing (twice ignited); ABT=1:32 min.; ABD=18 mm. | 115 |
| 24 | Self-extinguishing (twice ignited); ABT=1:03 min.; ABD=19 mm. | 117 |

What is claimed is:

1. A composition of decreased inflammability prepared by the free-radical polymerization of polymerizable compounds in a mixture comprising, per 100 parts by weight:
   (a) 50–87 parts by weight of methyl methacrylate;
   (b) 10–40 parts by weight of a member selected from the group consisting of tribromneopentyl acrylate, tribromneopentyl methacrylate, and compounds of the formula

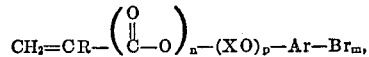

wherein R is hydrogen or lower alkyl, X is alkylene, Ar is phenyl or substituted phenyl, $n=0$ or 1, $p=0$ when $n=0$, $p=0$ or 1 when $n=1$, and $m$ is an integer from 1 to 5; and
   (c) 40 to 3 parts by weight of a flame-inhibiting phosphorus compound which forms phosphorus oxides when burned in air and which is selected from the group consisting of phosphoric acid and aliphatic and aromatic hydrocarbon, oxyhydrocarbon, and halohydrocarbon phosphoric and phosphonic acid esters.

2. A composition as in claim 1 wherein said flame-inhibiting phosphorus compound is a phosphoric acid.

3. A composition as in claim 1 wherein said flame-inhibitting phosphorus compound is a phosphoric acid ester selected from the group consisting of esters of phenols, of lower alkyl-substituted phenols, of halo-substituted phenols, and esters of the formula

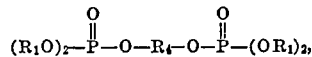

wherein each $R_1$ is the same or different $\beta$-halogenoalkyl goup and $R_4$ is alkylene or halo-substituted alkylene.

4. A composition as in claim 1 wherein said flame-inhibiting phosphorus compound is a phosphonic acid ester of the formula

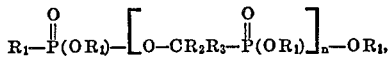

wherein each $R_1$ is the same or different $\beta$-halogenalkyl group; $R_2$ is hydrogen, alkyl, or aryl; $R_3$ is alkyl, aryl, haloalkyl, or haloaryl; and $n$ is an integer from 1 to 10.

5. A composition as in claim 1 which comprises from 1 to 5 parts by weight of acrylic acid or methacrylic acid in replacement of an equal amount of methylmethacrylate in component (a).

6. A composition as in claim 1 wherein component (b) is a member selected from the group consisting of di-, tri-, and penta-bromophenylmethacrylate.

7. A composition as in claim 1 formed by stretching, deep-drawing, or blowing while in a thermoelastic state.

References Cited
UNITED STATES PATENTS 3,177,185   4/1965   Hollander et al.   260—86.1 E
3,294,730   12/1966  Jukes et al.       260—45.7 P MELVYN I. MARQUIS, Primary Examiner U.S. Cl. X.R.

260—41 R, 47 UA, 86.1 E

UNITED STATES PATENT OFFICE
CERTIFICATE OF CORRECTION

Patent No. 3,817,913        Dated August 20, 1974

Inventor(s) Wolfgang Gaenzler and Guenter Schroeder

It is certified that error appears in the above-identified patent and that said Letters Patent are hereby corrected as shown below:

Column 1, line 28 change "n-0" to -- n=0 --; Column 2, line 32 change "phosphous" to -- phosphorus --; Column 4, in the right-hand portion of the structural formula, delete "CH-" between

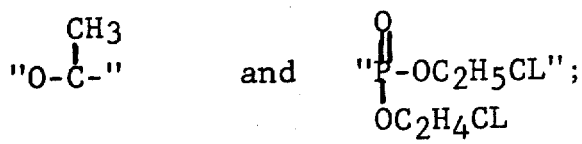

Column 5, line 61 change "re-" to -- ren- --; Column 8, line 16 change "p-0" to -- p=0 --.

Signed and sealed this 22nd day of October 1974.

(SEAL)
Attest:

McCOY M. GIBSON JR.
Attesting Officer

C. MARSHALL DANN
Commissioner of Patents